United States Patent [19]

Trombley et al.

[11] 4,193,672
[45] Mar. 18, 1980

[54] CONTACT LENS WITH IMPROVED INTERIOR SURFACE

[75] Inventors: Wayne E. Trombley; Ronald G. Seger, both of Midland, Mich.

[73] Assignee: Dow Corning Corporation, Midland, Mich.

[21] Appl. No.: 945,728

[22] Filed: Sep. 25, 1978

[51] Int. Cl.² .............................................. G02C 7/04
[52] U.S. Cl. ................................................ 351/160 R
[58] Field of Search ....................... 351/160 H, 160 R

[56] References Cited

U.S. PATENT DOCUMENTS

| Re. 29,229 | 5/1977 | Girard et al. | 351/160 |
| 3,187,338 | 6/1965 | Neefe | 351/160 |

FOREIGN PATENT DOCUMENTS 2203745  8/1973  Fed. Rep. of Germany ........... 351/160

*Primary Examiner*—John K. Corbin
*Assistant Examiner*—Scott J. Sugarman
*Attorney, Agent, or Firm*—Max J. Kenemore

[57] ABSTRACT

A contact lens has an improved interior surface which includes an optical zone and peripheral zone. The optical zone has a radius of curvature similar to that of the cornea of the eye to be fitted. The peripheral zone defines an arc which is substantially tangent to the optical zone at its edge and which intersects the curved line defined by the selected diameter of the lens at the selected sagittal depth. The lens can be formed from a hard or flexible material and can be made by a lathe turning or by molding.

14 Claims, 3 Drawing Figures

CONTACT LENS WITH IMPROVED INTERIOR SURFACE

BACKGROUND OF THE INVENTION

1. Field of the Invention

This invention relates generally to vision correction by spectacles and eyeglasses and more specifically to eye contact type opthalmic lenses.

2. Description of the Prior Art

Contact lenses are well known in the art and have enjoyed commercial success for some time. Early disclosures of contact lenses are typified by U.S. Pat. Nos. 722,059 to Volle and 1,869,366 to Dallos which describe scleral lenses made of glass. U.S. Pat. Nos. Re. 25,286 and Re. 29,229 are exemplary of disclosures relating to corneal contact lenses.

Much effort has been directed to improving the shape and design of the interior surface of contact lenses. Improved interior surface designs are generally directed to such advantages as increased comfort, improved tear exchange and the like.

For example, Fertsch et al. disclose in U.S. Pat. No. 1,921,972 a scleral lens having its inner surface formed from two spherical sections, each section having a different radius of curvature and spherical center. The shape edge where the two sections meet is smoothed by forming a third spherical cut. Discomfort to the eye caused by the sharp edge is thus reduced.

In U.S. Pat. No. 3,187,338 to Neefe, a corneal contact lens which has an aspherical inner surface is disclosed. The inner surface of the Neefe lens defines a sine curve so that its central area has a radius of curvature shorter than the cornea to be fitted and the outer edge has a longer radius. The lens of Neefe contacts the cornea in a load-bearing ring around its shoulder, leaving a vault over the center of the cornea. The position of the load-bearing ring on the cornea shoulder varies as the shape of the cornea changes. The edge of the lens is spaced apart from the cornea.

U.S. Pat. No. 3,495,899 to Biri shows yet another design for the inner surface of a contact lens. The inner surface of the scleral lens disclosed by Biri has a central corneal section and two concentric peripheral sections. The first peripheral section has a radius of curvature with its center on the optical axis through the corneal zone. The second peripheral zone has its center of curvature displaced to the nasal side of the optical axis. The second peripheral zone is thus flatter on the nasal side to more closely approximate the shape of the eye during close reading.

The invention described in commonly assigned copending patent application U.S. Ser. No. 919,651, filed June 28, 1978, relates to a semi-scleral contact lens having an inner surface shaped relative to the topography of an individual eyeball so as to provide improve centering of the lens, central and edge contact between the lens and the eye with tearfilm clearance there between and tear exchange with blinking. This lens has a central spherical optical zone which is the spherical equivalent of the radius of curvature of the cornea at its optical center line and the corneal dimensional diameter. The lens also has a curved peripheral section and a conical section between the peripheral section and the optical zone. The conical section is tangent to the optical zone and to the peripheral zone at their edges.

Girard et al. (U.S. Pat. No. Re. 29,229) shows semi-scleral contact lenses which arch over the cornea and also lenses which are flush fitting and in total contact with the cornea.

Scleral lenses (such as those disclosed by Volle and Dallos) have not been in popular use recently. Their design does not normally allow for movement of the lens on the eye, and it is known that such movement is desirable. When scleral lenses are made from an oxygen impermeable material, the supply of oxygen to a large area of the eye is blocked.

Semi-scleral and corneal contact lenses have been growing in popular use in recent years. However, an entirely satisfactory design for the inner surface of the lens has not been found.

Continuing research and development efforts have been directed to overcoming the disadvantages of current designs. For example, the corneal lens of Neefe demonstrates a less than ideal tear exchange upon blinking. Tear exchange is inhibited by the load-bearing ring. Another disadvantage of the Neefe design is that the raised edges of the lens can be an irritant to the inside of the eyelid.

Lenses designed to provide a vault over the cornea and lenses which fit flush with the cornea (such as the Girard et al. lenses) frequently result in less than desirable tear exchange upon blinking. Uninhibited tear exchange is desirable so as to provide the cornea with a constantly renewed supply of freshly oxygenated tears.

The design disclosed in copending application U.S. Ser. No. 919,651, filed June 28, 1978, shows improved centering of the lens, improved tear exchange and avoids the problem of eyelid irritation. However, even greater tearfilm clearance and tear exchange is desirable.

Extensive activity in contact lens development has resulted in lenses formed from a variety of materials having different properties. Materials used for contact lenses include plastics, such as polymethylmethacrylate; hydrogels, such as hydroxyethylmethacrylate; and rubbers, such as silicone rubber. A single lens design which can be used with a wide variety of these materials is desirable.

SUMMARY OF THE INVENTION

It is, therefore, a primary object of the present invention to shape the inner surface of a contact lens so as to provide central and edge contact with the eye, tearfilm clearance therebetween and tearfilm exchange with blinking.

It is also an object of the present invention to present a design for the inner surface of contact lenses which is useful in lenses made from a variety of materials.

It is another object of this invention to overcome the disadvantages of the prior art.

These and other objects are accomplished by the present invention which comprises, generally speaking, a contact lens having an interior surface which comprises an optical zone and a curved peripheral section. The optical zone has a radius of curvature substantially equal to the radius of curvature of the cornea of the eye to be fitted at its optical centerline.

The curved peripheral section extends between the optical zone and the edge of the lens. It describes an arc which is substantially tangent to the optical zone at its edge and which intersects the curved line defined by the selected diameter of the lens at the selected sagittal depth.

Such a lens demonstrates central and edge contact on the eye with tearfilm clearance therebetween and with improved tearfilm exchange upon blinking.

The contact lens of the present invention is made by a method which comprises forming the interior of the optical zone so that it has a radius of curvature substantially equal to the radius of curvature of the eye to be fitted. The method includes forming the interior surface of the peripheral section so that it describes an arc between the edge of the optical zone and the curved line defined by the selected diameter of the lens at its selected sagittal depth. The arc is tangent to the optical zone at its edge.

BRIEF DESCRIPTION OF THE DRAWINGS

The invention is described below with reference to the drawings in which.

DETAILED DESCRIPTION

Figure 1:
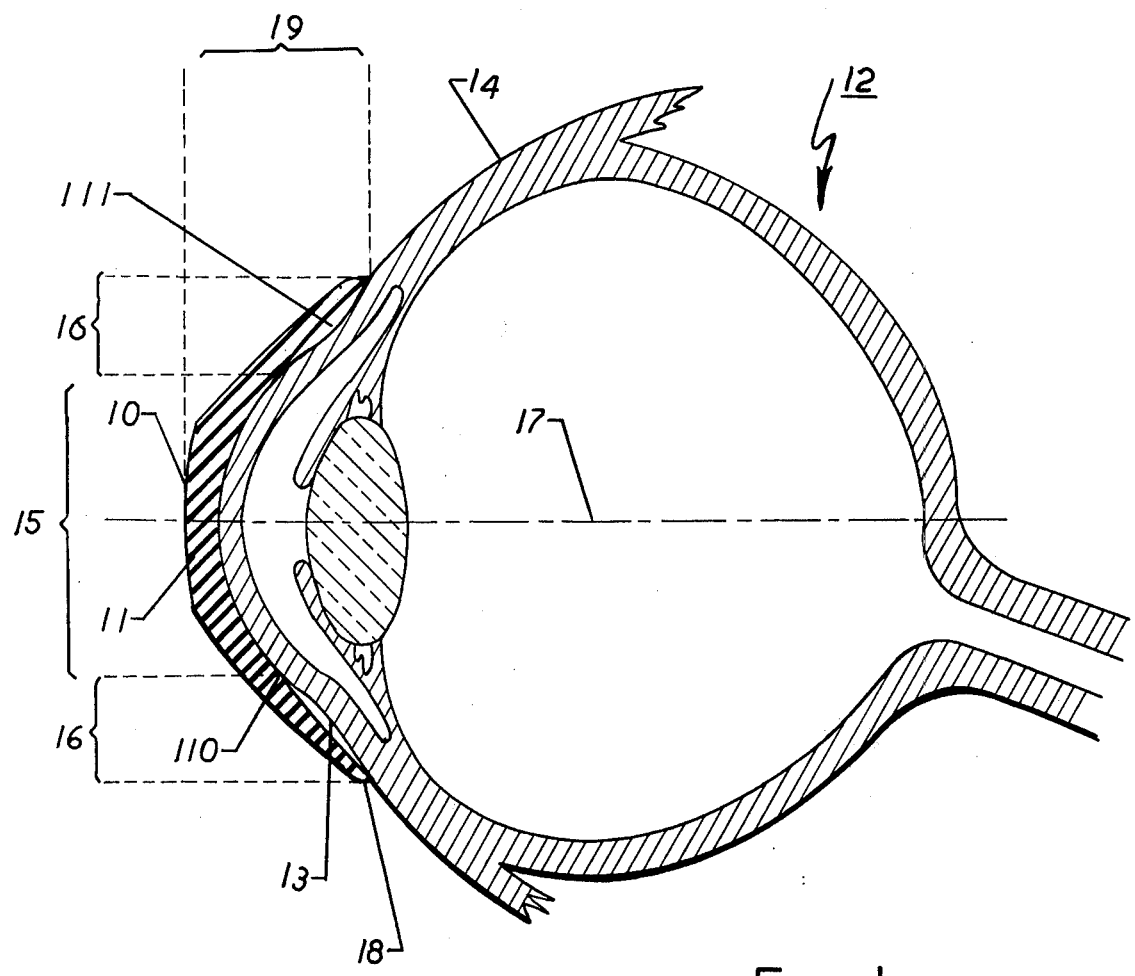
FIG. 1 shows schematically and in cross-section a semi-scleral lens of the present invention applied to the human eye.

Referring more specifically to FIG. 1 there is shown lens 10 positioned on cornea 11 of eyeball 12. Lens 10 is a semi-scleral lens and bridges limbus 13 so as to contact sclera 14.

Lens 10 includes an optical zone 15 and a peripheral zone 16. The inner (concave) surface of optical zone 15 has a radius of curvature substantially the same as the radius of curvature of cornea 11 at its optical centerline 17.

The inner surface of peripheral zone 16 is defined by an arc which extends from the optical zone 15 to the curved line described by edge 18 of lens 10 and the selected sagittal depth 19. Peripheral zone 16 is substantially tangent to optical zone 15 at the edge 110 of the optical zone.

Lens 10 exhibits central contact with cornea 11 and edge contact with sclera 14. There is clearance 111 for a tearfilm between the points of contact, and good tearfilm exchange is observed with blinking.

It is well understood by those familiar with the art that the term "contact" as used herein includes a thin layer of tears between the lens and the eye. Such a thin layer is understood to exist at the areas of contact between lens 10 and cornea 11 and sclera 14. Such a thin layer of tears at points of "contact" is well understood to be different from the relatively substantial tearfilm which exists in clearance 111.

Figure 2:
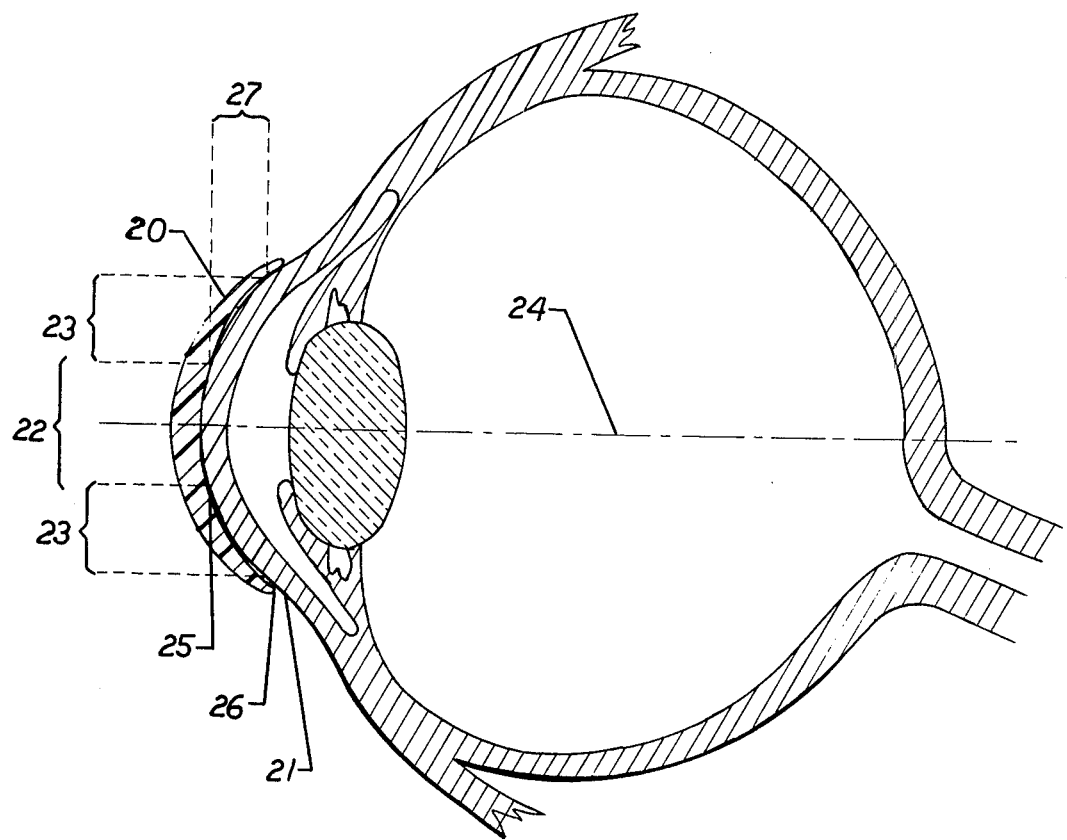
FIG. 2 shows schematically and in cross-section a corneal lens of the present invention applied to the human eye.

Referring more specifically to FIG. 2 there is shown corneal contact lens 20 positioned on cornea 21. Lens 20 has optical zone 22 and peripheral section 23.

Optical zone 22 has a radius of curvature which is substantially the same as the radius of curvature of cornea 21 at optical centerline 24.

Peripheral section 23 is tangent to the optical zone at its edge and describes an arc between edge 25 of the optical zone and the curved line defined by edge 26 of lens 20 and the selected sagittal depth 27.

Lens 20 exhibits central and edge contact with cornea 21 and tearfilm clearance 28 therebetween.

The optical zones of the embodiments of FIGS. 1 and 2 can have any useful diameter. Typically, useful diameters range from about 5.5 to about 10.5 mm. The optical zone diameter often is a function of the corrective power of the lens. Smaller diameters are generally preferred with higher corrective powers in order to minimize the necessary lens thickness.

Optical zones of less than about 5.5 mm are not generally useful. It has been observed that the average pupil will dilate to about 7 mm in darkened conditions. An optical zone of less than about 5.5 mm would be sufficiently smaller than a fully dilated pupil so that good vision would not be possible in low light conditions. An optical zone of greater diameter than about 10.5 mm provides no additional improvement in pupil coverage or low light vision.

An optical zone of greater than 10.5 mm diameter could be a disadvantage when the lens is made from an elastomeric material. At about 10.5 mm the average cornea has already started to flatten in shape. The placement of a spherical optical zone over a flattening corneal shape could cause an undesirable suction cup effect when an elastomeric lens material is used.

The inner radius of curvature of the optical zone matches or approximates that of the cornea of the eye to be fitted at the optical centerline. As a result, this radius of curvature normally varies from about 6.5 to about 9 mm.

The diameter of the lens normally varies from about 7.5 to about 16 mm, making the lens design useful with both corneal (FIG. 2) and semi-scleral (FIG. 1) contact lenses. A lens diameter of less than about 7.5 mm would not normally provide an optical zone large enough for clear vision in low light conditions. The peripheral zone typically requires about 2 mm. Thus a lens diameter of less than about 7.5 mm would not enable an optical zone of at least about 5.5 mm.

The lens diameter can be greater than about 16 mm, but there are no optical benefits of larger lens sizes. Larger lens sizes are useful for such applications as medication dispensing, and with patients with very large eyes or palprebal apertures and the like.

Lenses smaller than about 10.5 mm are preferably formed from a relatively hard material although they may be made from an elastomeric material. The hard material is preferred because it is easier to edge than is an elastomeric material at smaller sizes.

The lens design of the present invention is useful in corneal, scleral and semi-scleral lenses. Corneal lenses are those which are smaller in diameter than the limbus. Semi-scleral and full scleral lenses bridge the limbus. The specific diameters of such lenses vary greatly from person to person as do limbus diameters.

The lens thickness generally varies from about 0.03 to about 0.18 mm at the optical centerline and from about 0.03 to about 0.13 mm at the lens edge. Lens thicknesses smaller than about 0.03 mm present manufacturing difficulties, especially with molded elastomeric lenses.

Lens thicknesses at the optical centerline of greater than about 0.18 mm can cause comfort problems in some wearers. However, with afakic patients lens thicknesses up to about 0.75 mm are required.

In the case of corneal lenses a lens edge thickness of about 0.1 mm is believed to be about the greatest thickness which can be comfortably tolerated by the inside of the eyelid over long periods of time. The lens edge for elastomer lenses can be thicker without causing discomfort.

The lens of the present invention can be made by molding or machining, depending on the material from which the lens is made. The lens can be made from any useful material. Suitable materials include glass; hard resins such as polymethylmethacrylate (PMMA), cellulose acetate butyrate (CAB) or the silicone resin described in the commonly assigned copending application Ser. No. 905,626, filed May 15, 1978; and resilient materials such as silicone rubbers, hydroxyethylmethacrylate (HEMA), and other hydratable gels. Glass is seldom used in recent years for contact lenses because of its brittleness. PMMA is extensively used in contact lenses because of its toughness and because it can easily be made wettable.

A preferred material for the semi-scleral lens of FIG. 1 is silicone rubber. Silicone rubbers are generally siloxane elastomers filled with activated silica. The use of such rubbers as materials for corneal contact lenses is described in greater detail in U.S. Pat. No. 3,228,741 to Becker. Such silicone rubbers are desirable for semi-scleral lenses because of their oxygen permeability and because their resilience aids comfort and tear exchange.

A preferred material for the corneal lens of FIG. 2 is the silicone resin described in application Ser. No. 905,626, filed May 15, 1978, although other hard materials can be used. The silicone resin is preferred primarily because of its oxygen permeability characteristics.

Contact lenses according to the present invention can be formed by any of the well known molding or machining techniques using readily obtainable measurements. For example, the corneal radius of curvature can be observed. The optical zone diameter, lens diameter and the sagittal depth can be specified. From these measurements and specifications the inner surface of the optical zone and peripheral zone can be shaped according to the present invention.

Figure 3:
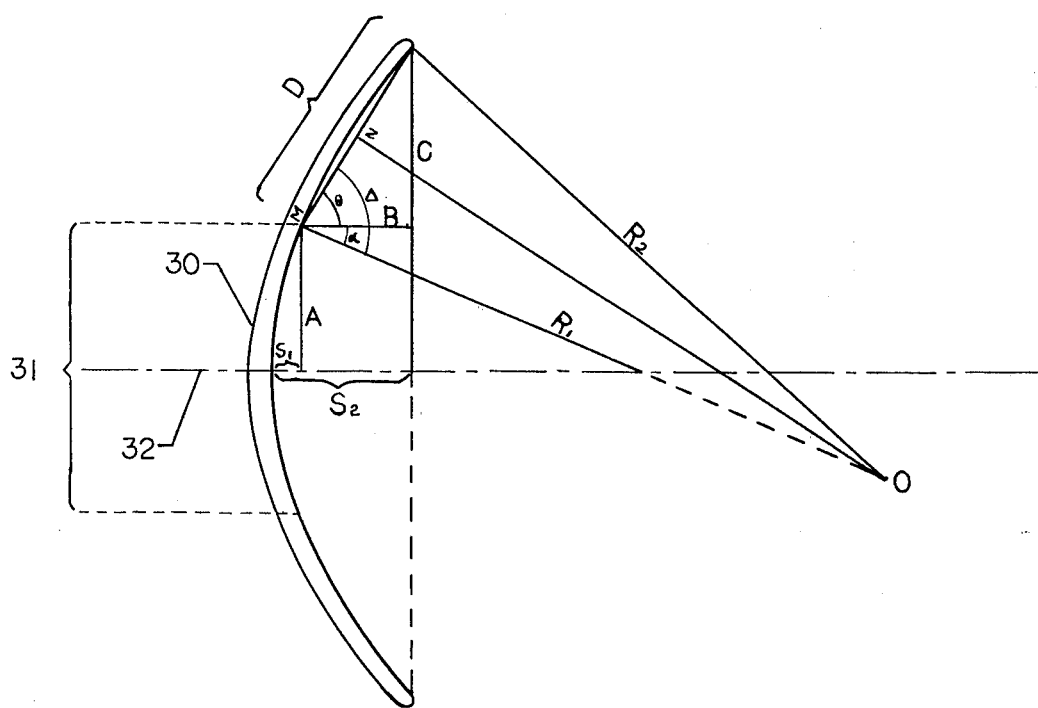
FIG. 3 shows diagrammatically how the radius of curvature of the peripheral zone is calculated.

Referring more specifically to FIG. 3 there is shown in diagrammatic form the method for calculating the peripheral curve (radius of curvature of the peripheral zone) based on a given optical zone radius of curvature and selected optical zone diameter, lens diameter and sagittal depth. The illustration given in FIG. 3 is typical of the calculations which would be made when turning a lens from a hard lens material. Reciprocal values would be used when turning a male mold for molding the inner surface of an elastomer or soft lens.

Lens 30 has optical zone 31. The inner curve of zone 31 is turned to have a radius of curvature $R_1$ which is substantially the same as the radius of curvature of the cornea of the eye to be fitted at its optical centerline. The center of radius of curvature $R_1$ is on optical centerline 32 of lens 30.

The radius of the optical zone is selected and is indicated at "a" in FIG. 3. The inner surface of optical zone 31 is turned at radius of curvature $R_1$ until optical zone radius "a" has been reached. The radius of curvature of the cutting head is then lengthened so that its arc is centered at O and the peripheral curve is turned. $R_2$ in FIG. 3 shows the radius of curvature of the peripheral zone. The length of $R_2$, i.e., the location of O can be calculated as follows:

The optical zone (O.Z.) half chord "a" is selected to be 3 mm. The radius of curvature of the cornea at its optical centerline $R_1$ is measured to be 7.8 mm. The sagittal depth of the lens $S_2$ is selected to be 2.96 mm, and the lens radius is specified as 6.75 mm.

The arcsin of $\theta = a/R_1 = 3/7.8 = 22.619865°$

Dimension C = the lens radius $- a = 6.75 - 3 = 3.75$ mm

Dimension $B = S_2 - S_1$ $S_2$ is specified to be 2.96 mm $S_1$, the sagittal depth of the optical zone, is calculated by the formula $S_1 = R_1 - R_1^2 - a^2$.

Thus, $S_1 = 7.8 - 7.8^2 - 3^2$ $S_1 = 7.8 - 7.2$ $S_1 = 0.6$ mm

B is then calculated as $B = S_2 - S_1$ $B = 2.96 - 0.6$ $B = 2.36$ mm

When B and C are known D may be calculated by the formula $D = B^2 + C^2$
$D = 2.36^2 + 3.75^2$
$D = 4.43$ mm Arcsin $\alpha$ is then known to be C/D or $3.75/4.43 = 57.833128$.

The angle $\Delta$ is the sum of the angles $\alpha + \theta$ or $57.833128° + 22.619865° = 80.452993°$.

The side MN can be calculated by $D/2 = 4.43/2 = 2.215$ and the side $R_2$ of the triangle MNO can then be figured by the formula $R_2 = MN/\cos\Delta$ $R_2 = 2.215/0.1658567$ $R_2 = 13.33$ mm It is observed from experience that most lens grinding machines can produce peripheral curves which appear to be exactly tangent to the optical zone when the calculations to obtain $R_2$ are carried out to six places past the decimal. However, substantially tangent curves are produced when the calculations are rounded to two places past the decimal.

When a lathe is being used to turn a lens the bit is first set so that it has a radius of curvature $R_1$ (7.8 mm) until the desired optical zone diameter is reached. Then the bit is adjusted at that point to have a longer radius of curvature $R_2$ (13.33 mm). Continued turning will result in a peripheral zone which is tangent to the optical zone at its edge and which intersects the curved line formed by the selected sagittal depth at the selected lens diameter. The radius of curvature $R_2$ will be individual for each variation of $R_1$, $S_2$, optical zone diameter and the lens diameter.

It will become apparent to those skilled in the art that $\Delta$ should be less than 90° to provide a peripheral curve which is tangent to the optical zone at its edge.

The invention is described below by way of example.

EXAMPLE 1

A subject is chosen for fitting of semi-scleral contact lenses according to the present invention. The radius of curvature of the subject's eye ($R_1$) is observed to be 7.8 mm. The half chord of the optical zone is selected to be 4 mm and the radius of the lens is selected to be 7 mm. The sagittal depth of the lens is selected to be 3 mm.

A convex die for a 14 mm diameter contact lens mold is turned on a Hardinge Model No. HSL59 lathe. The turning is performed according to the calculations set out in connection with FIG. 3. That is, the optical zone at the center of the jig is turned to have a 7.8 mm radius of curvature until the optical zone radius of 4 mm is achieved.

The lathe is adjusted at that point extend the radius of curvature of the peripheral section of the jig to about ($R_2$ in FIG. 3) to about 70.386315 mm.

A concave die is ground to provide vision correction in the optical zone.

A quantity of less than about 1 gram of a primarily dimethyl polysiloxane fluid elastomer available from Dow Corning is placed in the concave jig. The convex jig is positioned against the concave jig and a pressure is applied. The pressure is maintained while the fluid is cured for about 15 min. at about 150° C.

The lens is subjected to an ion plasma in a high humidity atmosphere to make its surface hydrophilic. It is then sterilized in a steam autoclave and made ready for patient dispensing.

The lens is observed to provide improved vision with good comfort.

Fluoroscein in ultraviolet light is used to observe the action of the lens on the eye and to observe the tearfilm. The lens is seen to move relative to the eye. The lens exhibits central and edge contact with tearfilm clearance there between. Tear exchange is observed with blinking.

EXAMPLE 2

A Glasflex ® PMMA button suitable for contact lens grinding is obtained from Electroglas, Inc. (Stirling, N.J.) and the inside curve of the lens is ground on a Levin lathe according to the corneal radius of curvature dimension observed on the subject of Example 1. A lens diameter of 7.5 mm, an optical zone diameter of 5.5 mm and a sagittal depth of 0.9 mm are selected. The inside curve of the optical zone is turned using a radius of curvature of 7.8 mm to an optical zone radius of 3.5 mm.

At the edge of the optical zone the radius of curvature is extended to 27.668884 mm and the peripheral curve is cut in the lens to its edge at a radius of 3.75 mm.

The outer surface of the lens is finished to give the require optical correction.

The lens is sterilized and wetted with Liquifilm contact lens wetting solution, a commercially available wetting solution produced by Allergan Pharmaceuticals (Irvine, Calif.).

The lens is placed in the subject's eye and is observed to perform substantially the same as the resilient lens of Example 1 except that correction of the subject's astigmatism is reported to be better with the PMMA lens.

The present invention has been disclosed in the above teachings, drawings and examples with sufficient clarity and conciseness to enable one skilled in the art to make and use the invention, to know the best mode for carrying out the invention and to distinguish it from other inventions and from what is old. Many variations and obvious adaptations of the inventions will readily come to mind, and these are intended to be contained within the scope of the invention as claimed below.

What is claimed is:

1. A contact lens having an interior surface which comprises:
    (a) an optical zone with a radius of curvature substantially equal to the radius of curvature of the cornea of the eye to be fitted at its optical centerline; and
    (b) a curved peripheral section extending between the optical zone and the edge of the lens, the peripheral section describing an arc which is tangent to the optical zone at its edge, whereby the lens demonstrates central and edge contact on the eye with tearfilm clearance there between and with tearfilm exchange upon blinking.

2. The lens of claim 1 wherein the optical zone has a diameter of from about 5.5 to 10.5 mm.

3. The lens of claim 1 wherein the lens diameter is from about 7.5 to about 16 mm.

4. The lens of claim 1 wherein the radius of curvature of the optical zone ranges from about 6.5 to about 9 mm.

5. The lens of claim 1 wherein the lens thickness at the optical zone centerline ranges from about 0.03 to about 0.7 mm.

6. The lens of claim 1 wherein the lens thickness at its outer edge ranges from about 0.03 to about 0.1 mm.

7. The lens of claim 1 wherein the diameter of the optical zone is from about 5.5 to about 10.5 mm.

8. The lens of claim 1 which is formed from a relatively hard material.

9. The lens of claim 8 wherein the relatively hard material is selected from the group consisting of polymethylmethacrylate, silicone resin, polycarbonate resin and cellulose acetate butyrate.

10. The lens of claim 1 which is formed from a flexible material.

11. The Lens of claim 10 wherein the flexible material is selected from the group consisting of hydrogels and silicone rubber.

12. The method for making a contact lens having an interior surface which demonstrates central and edge contact on the eye to be fitted with tearfilm clearance there between and with tearfilm exchange upon blinking, the method comprising:
    (a) forming the interior surface of the optical zone so that it has a radius of curvature substantially equal to the radius of curvature of the cornea of the eye to be fitted at its optical centerline;
    (b) forming the interior surface of a peripheral section so that it describes an arc between the edge of the optical zone and the edge of the lens, the edge of the lens being defined by a specific diameter of between about 7.5 and about 16 mm and the selected sagittal depth of the lens, the arc being tangent to the optical zone at the edge thereof; and
    (c) forming the exterior surface of the lens to provide optical correction.

13. The method of claim 12 wherein the lens is formed from a machinable material and the steps of forming are accomplished by lathe turning.

14. The method of claim 12 wherein the lens is formed from a moldable material and the steps of forming are accomplished by subjecting such material to the action of a mold having concave and convex dies.

* * * * *

UNITED STATES PATENT AND TRADEMARK OFFICE
CERTIFICATE OF CORRECTION

PATENT NO. : 4,193,672
DATED : March 18, 1980
INVENTOR(S) : WAYNE E. TROMBLEY and RONALD G. SEGER It is certified that error appears in the above-identified patent and that said Letters Patent are hereby corrected as shown below:

Column 1, line 27, "shape" should read --sharp--.

Signed and Sealed this

Thirtieth Day of December 1980

[SEAL]

Attest:

SIDNEY A. DIAMOND

Attesting Officer

Commissioner of Patents and Trademarks